UNITED STATES PATENT OFFICE.

ARTHUR PERCY MORRIS, OF INSEIN, BURMA, INDIA.

POTTERY-WARE.

1,362,956.  Specification of Letters Patent.  Patented Dec. 21, 1920.

No Drawing.  Application filed October 18, 1920. Serial No. 417,792.

*To all whom it may concern:*

Be it known that I, ARTHUR PERCY MORRIS, a subject of the King of England, residing at Insein, Burma, India, and formerly at Herne Bay, in the county of Kent, England, have invented certain new and useful Improvements in Pottery-Ware, of which the following is a specification.

This invention is for improvements in or relating to the manufacture of pottery and has for its object to provide an improved method of figuring or ornamenting pottery of the type known as Burmese black pottery.

In the manufacture of this black pottery the clay article is fired in the usual way in a kiln and the black coloration is effected toward the end of the firing by providing a smoky atmosphere in the interior of the kiln which is then closed and the firing completed. The carbon from the smoke becomes deposited on the surface of the partially fired clay, and to a certain extent enters into the pores thereof so that an integral black coloring is obtained.

The object of the present invention is more specifically to produce figuring or patterns on such black ware and this invention accordingly consists in removing the carbon blackening by oxidation thereof, over a predetermined area or areas to reveal the natural color of the clay.

In a preferred process the oxidation is effected by applying to the area to be decarbonized a material which releases oxygen under the action of heat. Conveniently the decarbonizing material is applied in the form of a paste.

According to another feature of the invention the process consists in applying, in a pattern, to the blackened surface a paste of clay with an oxidizing agent, such as potassium chlorate, and then heating the ware to a temperature high enough to release the oxygen but below that at which the clay is ordinarily fired, a suitable temperature for example being about 400° C., and finally removing the dried paste after the decolorizing has been effected. This invention also comprises articles manufactured or figured in accordance with the above described processes.

In a specific application of this invention, the usual manufacturing process is followed so as to produce an article which is blackened all over. A paste of clay and water is mixed with an oxidizing agent such as potassium chlorate, potassium nitrate, or other suitable material rich in oxygen. This paste is painted on to the blackened ware according to the pattern or configuration which it is desired to show on the black surface. This is easily effected because the paste is white or light in color and shows up clearly on the black background. The article thus painted is re-heated in a kiln but at a temperature considerably below that of the original firing as all that is desired is that the temperature should be sufficient to release the oxygen which is in combination in the paste. This oxygen then oxidizes the carbon forming the black coloration wherever the paste has been applied to the blackened surface and thereby decolorizes it.

The object of mixing the oxidizing agent with clay as a paste is to provide some body for the said oxidizing agent which shall retain it effectively in contact with the surface which it is to decolorize.

The temperature at which the second heating is made is not sufficient to bring about the firing of the clay forming the paste or its adherence to the blackened article which is being treated. When the oxidation of the carbon is complete the article is removed from the kiln and the oxidizing paste can be easily removed if it has not already fallen off, in flakes. The pattern over which the paste was originally spread is then revealed in the natural color of the original clay owing to the complete removal of the blackening coloration.

Obviously the coloring of the figuring is thereby dependent upon the color of the original clay and may be modified accordingly, by selection of the clay to be used, so as to produce either uniform coloring of the figuring or different coloring of different portions of the figuring as may be desired. These and other modifications are all held to lie within the scope of the present invention as set forth in the accompanying claims.

What I claim as my invention and desire to secure by Letters Patent is:—

1. The process for figuring "Burmese black" pottery, consisting in removing the carbon blackening by oxidation thereof, over a predetermined area, to reveal the natural color of the clay.

2. The process for figuring pottery consisting in firing the clay in a carbonaceous atmosphere and blackening it all over, applying an oxidizing material to portions of the blackened surface, and reheating the clay.

3. The process for figuring blackened pottery consisting in applying to a predetermined area of the surface thereof a material which releases oxygen under the action of heat.

4. The process for figuring blackened pottery consisting in applying to its surface a pattern of a pasty material from which oxygen can be released.

5. The process for figuring blackened pottery consisting in applying in a pattern to the surface thereof, a paste of clay and oxidizing agent, heating to a temperature that is sufficient to release the oxygen but not to fire the clay, and finally removing the dried paste.

6. The process for figuring "Burmese black" pottery consisting in applying potassium chlorate to the surface in a pattern, and heating the pottery to release oxygen from the potassium chlorate.

7. The process for figuring pottery consisting in firing it in a carbonaceous atmosphere till the surface is blackened, cooling it, applying in a pattern to the blackened surface a paste of clay and potassium chlorate, reheating the pottery at a temperature of about 400° C., and finally removing the dried paste.

8. The process of figuring pottery consisting in molding the pottery of clay of different colors, firing it in a carbonaceous atmosphere to blacken it, and removing the blackening by oxidation to expose in a pattern the varying colors of the original clays.

9. Pottery-ware figured by the process of first blackening it by firing in a carbonaceous atmosphere, and subsequently removing the carbon-blackening by oxidation over the area of a pattern.

In testimony whereof I affix my signature.

ARTHUR PERCY MORRIS.